Patented July 20, 1926.

1,593,485

UNITED STATES PATENT OFFICE.

GEORGES EUGENE EDME CROSNIER, OF ROUEN, FRANCE.

ANTISEPTIC PRODUCT.

No Drawing. Application filed August 21, 1925, Serial No. 51,680, and in France June 29, 1925.

The object of my invention is an antiseptic and deodorizing product which can be prepared in a pulverulent or compressed state and used either as a powder or dissolved in water. This product is chemically neutral and is odourless and non-toxic. It can therefore be shipped in any metallic containers either as a powder or dissolved without any danger of corroding the said containers.

It is essentially made out of an intimate mixture of the following salts.

1. Sulfophenate of zinc the Pará variety whereof is preferably used. The sulfophenate of zinc is the bactericid and microbicid agent of the product. It is a very powerful bactericid. Even diluted in a volume of water one hundred times greater it kills several species of microbe in a very short time.

Though it is derived from phenol this salt is odourless, whether pulverulent or dissolved. It dissolves in water almost instantaneously and shows itself clearly as basic, it produces a yellow color with methyl orange and a violet color with litmus. Lastly the zinc which it contains helps as explained hereunder to stop the bad odours arising from fermentation and putrefaction.

2. Another salt of zinc preferably sulphate.

3. An alkaline acetate or an acetate dissolving in water without producing a precipitate with the zinc salts used.

The use of the second zinc salt, preferably sulphate, is for deodorizing. Through its metal it absorbs sulphuretted hydrogen and ammoniacal gases and gives white precipitates which do not stain or spoil linen, clothes, hangings, etc. . . and which can be easily removed by brushing or otherwise.

The said gases being absorbed, the bad odours arising from putrefaction and mouldiness disappear at once.

Zinc sulphate, with no iron, is preferably used because it is a non-acid salt as opposed to zinc chloride. Moreover it affords the great advantage of being non-hygroscopic which is very important if the product is used as a powder. The product made up with zinc chloride, for instance, could not be used in powder, as the zinc chloride is extremely deliquescent and would produce at once, in moist air, a thick paste.

Lastly the zinc sulphate prevents to a certain extent the development of microbes and of bacteriæ.

The acetate used which is an alkaline acetate or an acetate dissolving in water without forming a precipitate with the zinc salts is necessary for two purposes viz:

1. It enhances greatly the deodorizing action of the zinc salt; the sulphuretted hydrogen ($H_2S$) does not precipitate zinc in presence of acids and in neutral solutions the salts of strong acids are very incompletely precipitated. In both cases, the deodorizing would not-be produced or would be very incomplete. A chemical equilibrium takes place and some strong acid is freed whereby the solution becomes very acid according to the equation.

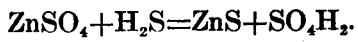

$$ZnSO_4 + H_2S = ZnS + SO_4H_2.$$

The strong sulphuric acid formed would allow $H_2S$ to be disengaged. The addition of an acetate, such as sodium acetate makes the reaction complete.

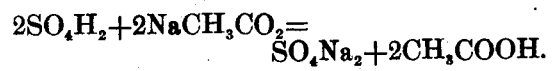

$$2SO_4H_2 + 2NaCH_3CO_2 = SO_4Na_2 + 2CH_3COOH.$$

The deodorizing is thus complete.

2. The acetate such as sodium acetate keeps the solution neutral because it prevents the formation of a strong acid such as sulphuric, hydrochloric or nitric acid, the weak acetic acid being disengaged in their lieu. In the case of zinc chloride, its solution would be made basic by the addition of sodium acetate whereas it was originally acid.

Besides, sodium acetate like zinc sulphate is absolutely neutral.

The three substances the mixture of which constitutes the product which is the object of my invention are all very soluble in water, whereby a great quantity of salts can be concentrated into a very small volume. These salts mixed together each keep their own characteristics and make up a product having the desired properties.

The neutrality of the mixture is very important; objects in metal such as surgical instruments are not attacked. This neutrality is proved by the reaction of methyl orange which remains yellow and of litmus which remains violet whereas both methyl orange and litmus would become red if there remained the least acidity.

By way of example a good result is obtained by either of following mixtures (for one litre of water the second of which may only be used as a solution).

$SO_4Zn, 7H_2O$ 250 gr.
Sodium acetate 20 gr.
Zinc sulphophenate 50 gr. or
$ZnCl_2$ 125 gr.
Sodium acetate 75 gr.
Zinc sulphophenate 50 gr.

Of course an inert substance can be added to those mixtures such as borax, sea-salt or any antiseptic substance dry or liquid (when a solution is used).

For preparing the dry mixture, the three components are crushed and mixed together.

If the antiseptic product is to be used as a powder, the components should previously be dried, at 100° C. for instance. If it is to be used in the form of compressed tablets the drying should only be partial.

The tablets dissolving entirely in water show the advantage of allowing easily a solution of a given microbicid power to be made which is especially useful in the case of veterinary practice.

For preparing the mixture under liquid form, it is of advantage to dissolve first the zinc sulphate, then the acetate and last of all the zinc sulphophenate. This order has not a great importance however and any other order will produce the same final result.

The product constituted by the above described mixture is a very powerful disinfectant which destroys instantaneously bad odours, besides being a most effective bactericid which can be used without any inconvenience for surgical or veterinary purposes. It may be used in hospitals, water closets, breweries, tanneries, slaughter-houses, stables and the like. It should generally be used as a spray after it has been suitably diluted in water. The solution can also be used for washing the parts which are to be disinfected.

What I claim is:—

1. An antiseptic and deodorizing product having a neutral reaction and very soluble in water formed by the mixture of sulphophenate of zinc, of a second zinc salt and of an acetate soluble in water and producing no precipitate with the zinc salts used.

2. An antiseptic and deodorizing product as claimed in claim 1 the second zinc salt of which is sulphate of zinc.

3. An antiseptic and deodorizing product as claimed in claim 1 the sulphophenate of zinc of which is of the Pará variety.

In testimony whereof I have affixed my signature.

GEORGES EUGENE EDME CROSNIER.